United States Patent [19]

Stead et al.

[11] 3,997,672

[45] Dec. 14, 1976

[54] BACON PROCESSED PRODUCT

[76] Inventors: Emmett T. Stead, 100 N. Park, LaGrange, Ill. 60525; Ray A. Kennedy, P.O. Box 1134, Sioux City, Iowa 51102

[22] Filed: Aug. 27, 1975

[21] Appl. No.: 608,338

Related U.S. Application Data

[63] Continuation-in-part of Ser. No. 545,801, Jan. 1, 1975, abandoned, which is a continuation of Ser. No. 403,315, Oct. 3, 1973, abandoned, which is a continuation-in-part of Ser. No. 208,982, Dec. 16, 1971, abandoned.

[52] U.S. Cl. .............................. 426/59; 426/645; 426/646
[51] Int. Cl.$^2$ ......................................... A23L 1/31
[58] Field of Search ............ 426/59, 646, 641, 645, 426/513

[56] References Cited

UNITED STATES PATENTS

| | | | |
|---|---|---|---|
| 2,907,661 | 10/1959 | Niven, Jr. et al. | 426/59 |
| 3,399,065 | 8/1968 | Wistreich et al. | 426/42 |
| 3,642,496 | 2/1972 | Gibson | 426/513 X |
| 3,890,451 | 6/1975 | Keszler | 426/641 X |
| 3,901,981 | 8/1975 | Draudt | 426/645 X |

*Primary Examiner*—R. B. Penland
*Attorney, Agent, or Firm*—Gardiner, Sixbey, Bradford & Carlson

[57] ABSTRACT

A process for preparing a bacon product by grinding the small pieces of pork belly into an emulsion and, adding a cure mixture. The emulsion is then cured for a predetermined period and thereafter placed into molds and slowly cooked at varying temperatures. The molded cooked product thereafter is chilled. In an alternate process, the small pieces of pork belly are cured prior to grinding into an emulsion. In a further embodiment, the bacon product is chilled after curing and packaged for marketing.

6 Claims, No Drawings

BACON PROCESSED PRODUCT

This invention relates to a process for the preparation of food products. More particularly, it relates to a process of forming an edible bacon flavored product. This application is a continuation-in-part application of application Ser. No. 545,801, filed Jan. 1, 1975 now abandoned, which is a continuation of Ser. No. 403,315 filed Oct. 3, 1973, entitled BACON PROCESSED PRODUCT, now abandoned, which is a continuation-in-part of Ser. No. 208,982, filed Dec. 16, 1971, entitled BACON PROCESSED PRODUCT, now abandoned.

There are several problems encountered in the production of bacon as presently available on the market. Pork bacon is a product made from the belly area of a hog. The muscle structure is such that it flexes with the movement of the hog which produces a muscular fat structure in this area of the hog that is different from other fat areas of the hog. Due to this muscular development the fat takes on a particular character when cooked. The character of pork bacon, has a distinctive type of flavor and a distinctive bite. There are at least three different muscular and fat to meat ratios in the bacon type pork belly which produce different flavors and bites when cooked. It is therefore very difficult for the processor to produce a uniform bacon flavored product even though every portion of bacon is processed in the same manner.

A further problem arising from the conventional method of producing bacon is caused by accumulations of nitrites and nitrates. When bacon is cured, the cure mixture includes nitrate and nitrite in small amounts which cause the red meat to turn a bright red color and to hold the color while being marketed. The nitrate and nitrites in a solution are pumped into the belly portion meat with hollow needles that frequently cause the internal parts of the belly meat to expand, resulting in numerous internal accumulations of cure solution which, are in the trade, referred to as "pickle pockets".

After the pumping process the belly is placed in a vat or other suitable container containing a cure solution. The fat portion of the belly repels the water soluable cure solution, but the meat area, which is a porous structure, accepts the cure solution. For this reason, the nitrate and nitrite may collect in dangerous quanties in the red meat during the cure step and if the accumulations are excessive, consumption of such meat containing the concentrated accumulations may be detrimental to the health of the consumer. The pickle pockets do not slice evenly when the pork belly is sliced and these slices are put in with bacon ends and pieces that must be marketed at a lower price.

These problems are overcome by the process of the present invention which produces a meat product which tastes very similar to bacon and has substantially the same texture when it is being eaten.

It is an object of this invention to provide a process for producing a food product which utilizes the pork belly, including relatively small particles of all sizes and shapes of pork belly meat which are usually discarded in ordinary bacon production.

Another object of this invention is to provide a process for making a bacon flavored product which is fully cooked when purchased and results in very little skrinkage when heated for consumption.

A further object of the invention is to provide a process for making a processed bacon product which has a bright red meat appearance without the use of nitrites.

The present process results in a bacon product which has an appearance quite different from sliced bacon. There is no separation between the fat and lean areas yet the product is crisy to the bite.

The processed bacon product according to the present invention may be packaged and marketed prior to cooking if so desired.

In U.S. Pat. No. 3,642,496 there is disclosed a method of forming a bacon utilizing bacon ends. In this process bacon ends are frozen and then chipped in a meat chipper to produce pieces of bacon approximately ¼ inch in thickness and weighing from 6 to 8 ounces per chip.

A meat addition, consisting of a portion of the animal with a high gelatin and protein content such as cured ham shanks is ground in a conventional manner. The frozen chipped bacon ends and meat addition are then placed in a grinder and ground together. After grinding, egg white is added to act as a binder in the result mixture.

An important aspect of the present invention is that the bacon product formed by the subject process does not utilize any component that is not found in regular bacon. Because of the unique product formed by the present process, applicant has recently obtained permission from the USDA to market his product as a bacon product. The products presently on the market, similar to that product formed by Gibson, may not be labeled as bacon since such products include meat or other substances which are not found in bacon.

In the present method, the meat, which consists entirely of pieces of pork belly, is ground into a very fine emulsion. The meat and fat are so intermixed that the natural gelatin contained in the fat and meat acts as a binder and prevents the product when molded into a desired shape from falling apart even though the product has not been cooked.

No additive is necessary to hold the formed product in a desired shape as in the conventional methods. The raw processed product has the appearance of bright red meat in as much as the fat and meat are so finely intermixed. The fat of the pork belly gives the resulting raw product a somewhat "mottled" appearance without taking away the red meat look which enhances its marketability. There is no need to add a substance to redden the meat as is the present practice in bacon.

As pointed out, the use of nitrites in bacon cure has been discovered to pose a potential health hazard to humans. Many recent studies have discovered that the formation of carcinogenic nitrosamines is caused by the reactions between nitrite and secondary amines. Numerous experiments have shown that nitrosamines can be formed in the stomach from amines and nitrite and tumors have been induced by such feeding.

Reference is made to the following reports which substantiate the statement as to the potential hazard of nitrite in processed meat. This list is by no means a complete listing of such studies but exemplary only.

"The Role of Lean and Aclipose Tissue on the Formation of Nitrosophyrrolidine in Fried Bacon" 1070- Journal of Food Science-Volume 22 No. 6 Page 1026, Nov./Dec. 1974.

"Nitrosamines Studies: Neoplasms of Liver and Genital Mesothelium in Nitrosopyrrolidine-Treated MRC Rats" Journal of National Cancer Institute, Vol. 48, pages 1687–1696, 1972.

This potential hazard has been recognized by the government and limitations on the use of sodium nitrite are placed on plants operating under federal inspection by the Meat Inspection Division of the U.S.D.A. According to these regulations, sodium nitrite should not exceed 200 p.p.m. in the product after curing and processing.

With the process of the subject invention, no problem is encountered in meeting such standards since the nitrite is not used in the cure. As stated above, the present invention produces a "red meat" appearance without the addition of nitrite.

The resulting emulsion is then placed into molds and thereafter chilled to a temperature between 28° F. and 30° F. The formed product may then be packaged and marketed in the same manner as conventional sliced bacon.

The following are examples of ingredients and procedural steps utilizing in accordance with the present invention producing a processed bacon product.

EXAMPLE 1

A cure mixture having the following formulation of ingredients was prepared:

|  | Range |
|---|---|
| Pepsin | 1.0% – 2.0% |
| Salt | 79.0% –81% |
| Sugar | 20.00%–17.0% |

This mixture was added to water in the proportion of 4 pounds of mixture to every 5 gallons of water to form a cure solution. to this solution, 10 teaspoons of liquid smoke, a commercial brand labeled Griffith Natural Smoke Flavor, S.F.-18 neutralized, were added. This solution was used to cure 100 pounds of fresh meat in the following manner. Between 2% to 5% of lean red meat was trimmed from the 100 pounds of meat and ground to form an emulsion. The remaining meat was sliced into strips 2 to 6 inches in width and placed into vats together with sufficient cure solution so that all strips of meat were submerged therein. The meat was left in the cure solution for approximately 2 hours and maintained at a temperature of between 40° F. and 50° F. The meat must be left in the cure solution for at least 1 hour and must not be left in the cure solution for over 6 hours.

When the strips of meat were removed, they were cut into small pieces and fed into grinding apparatus. The lean red meat previously ground into an emulsion is fed into the grinding apparatus in small amounts substantially at a rate proportionate to the percentage trimmed from the original 100 pounds. For example, if 2% of lean red meat were trimmed, then 1 pound of the emulsion would be metered into the grinding apparatus for every 49 pounds of cured pieces. If 5% of lean red meat were trimmed, then 1 pound of the emulsion would be metered into the grinding apparatus for every 19 pounds of cured pieces.

In one instance, the resulting emulsion was then placed into molds and cooked slowly in the following manner. The molds were placed into an oven at a temperature of 78° F., the temperature was raised a few degrees at a time over a four-hour period until the temperature of 128° F. Temperature thereafter was slowly increased by a few degrees at a time until the temperature reached 152° F. over a period of 2 hours.

The resulting bacon product was thereafter removed from the oven and chilled to a temperature of between 28° F. to 30° F. In another instance, the resulting emulsion was placed into molds and chilled to a temperature of between 28° F. to 30° F. The formed products were then packaged and kept refrigerated at a conventional temperature somewhat less than 50° F.

EXAMPLE II

A dry cure mixture having the formation of Example I was prepared. One hundred pounds of fresh pork belly meat was cut into small pieces and fed into the grinding apparatus with the dry cure mixture being metered into the grinding apparatus simultaneously therewith. Ten teaspoons of liquid smoke were added to the dry mixture and the mixture was added at a rate of 0.04 pounds per pound of meat. The meat was maintained at a temperature of between 40° F. and 50° F. during the grinding operation. In one instance, the resulting emulsion was thereafter cooked and chilled in the same manner as Example I. In a further instance, the resulting emulsion was chilled and packaged in the same manner as in Example I.

This results in a fully cooked and cured bacon product which has a longer shelf life and a reduced loss of fat when heated for consumption.

Present sliced bacon looses between 60–65% of the fat when cooking, the present product during its slow graduated period of cooking looses only 5–6% of the fat. This is due to the fact that the fat when the meat is ground and mixed becomes so intermixed with the red meat portions that little of it is lost when cooking. Additionally, the natural gelatin acts as a binder to prevent the product from crumbling apart when cooked.

The process of the subject invention may be utilized to make "Canadian" bacon. In this embodiment, instead of using pork belly, the meat processed would be the loin. It would be processed in the same manner as above and utilizing the same cure mixture.

A processed ham could also be formed with the subject process. In this embodiment the hind quarter of the hog would be processed the same as the bacon described above and the same cure mixture would be utilized for the ham as for the bacon.

The subject process could also be used in producing processed corned beef. In this embodiment, the brisket of the beef would be processed in the same manner as the bacon described above. The cure mixture would be different. The cure mixture would comprise the following:

10 lbs. water
4½ lbs table salt
3 lbs brown sugar
1½ lbs of coarse picke ground pure salt
2½ lbs cream of tartar

We claim:
1. The method of producing a processed bacon product comprising the steps of grinding only fresh pork belly meat to form an emulsion, adding a nitrite free dry cure mixture comprised of 1%–2% pepsin, 79%–81% salt and 20%–17% sugar, during the grinding step, placing said emulsion in molds, cooking said emulsion at gradually increasing temperature from a minimum of 78° to a maximum of 152° F. for a period of six hours and thereafter chilling said cooked emulsion.

2. The method of producing a processed bacon product according to claim 1 wherein the step of cooking is accomplished by raising the cooking temperature several degrees at a time until the temperature reaches 128° F. over a four-hour period and thereafter continuing raising the temperature by increments for two hours until a maximum temperature of 152° F. is reached.

3. The method of producing a processed bacon product comprising the steps of trimming a small portion of lean red meat from a piece of fresh pork belly meat solely, grinding said lean red meat into an emulsion, slicing the remaining meat into strips, immersing said strips in a nitrite free cure solution comprised of 1%–2% pepsin, 79%–81% salt and 20%–17% sugar, for a predetermined time not less than one hour and not more than six hours, maintaining the cure solution at a temperature of between 40° F and 50° F., removing said strips from the solution and chopping said strips into small chunks, feeding said chunks into grinding apparatus and simultaneously metering said emulsion into said grinding apparatus, placing the resultant emulsion into molds and cooking at a gradually increasing temperature from a starting temperature of 78° F to a maximum temperature of 152° F for a period of six hours.

4. The method of producing a processed bacon product according to claim 3 wherein the step of cooking is accomplished by raising the cooking temperature several degrees at a time until the temperature reaches 128° F. over a four-hour period and thereafter continuing raising the temperature by increments for two hours until a maximum temperature of 152° F. is reached.

5. A method of producing a processed bacon product having a bright red meat appearance without the addition of nitrite comprising the steps of finely grinding only fresh pork belly meat into an emulsion so that no distinct separation between fat and meat is visible, adding a nitrite free dry cure mixture at the rate of 0.04 pounds per pound of meat, maintaining the meat during the grinding operation at a temperature of between 40° F. and 50° F., said cure mixture comprised of the following:

| Pepsin | 1.0%–2.0% |
| Salt | 79.0%–81.0% |
| Sugar | 20.0%–17.0% | and thereafter molding said product into desired shape and chilling to a temperature of between 28° F. and 30° F.

6. A processed bacon product having a bright red meat appearance containing no nitrite and vegetable matter formed by the method comprising the steps of finely grinding fresh port meat into an emulsion so that no distinct separation between fat and meat is visible, said pork meat consisting of pork belly meat solely, adding a bacon cure mixture containing no nitrite nor nitrate at a predetermined ratio of cure to meat, maintaining the meat during the grinding step at a temperature below 50° F and thereafter molding said product into desired shape without the addition of a vegetable binder and chilling to a temperature below the grinding temperature sufficient to cause the product to maintain its homogeneous molded shape.

* * * * *